(12) United States Patent
Wilson

(10) Patent No.: US 7,966,353 B2
(45) Date of Patent: Jun. 21, 2011

(54) METHOD AND SYSTEM FOR FLEXIBLY PROVIDING SHARED ACCESS TO NON-DATA POOL FILE SYSTEMS

(75) Inventor: Christopher S. Wilson, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 914 days.

(21) Appl. No.: 11/338,916

(22) Filed: Jan. 25, 2006

(65) Prior Publication Data

US 2006/0173929 A1 Aug. 3, 2006

Related U.S. Application Data

(60) Provisional application No. 60/648,583, filed on Jan. 31, 2005.

(51) Int. Cl.
*G06F 12/00* (2006.01)
(52) U.S. Cl. ........ 707/822; 711/100; 711/147; 707/823; 707/828
(58) Field of Classification Search .................. 711/100, 711/147; 707/822–823, 828
See application file for complete search history.

(56) References Cited

U.S. PATENT DOCUMENTS

| | | | |
|---|---|---|---|
| 5,367,682 A | 11/1994 | Chang | |
| 5,535,375 A * | 7/1996 | Eshel et al. | 703/27 |
| 5,539,879 A | 7/1996 | Pearce et al. | |
| 5,680,540 A | 10/1997 | Pearce | |
| 6,173,376 B1 | 1/2001 | Fowler et al. | |
| 6,438,639 B1 | 8/2002 | Bakke et al. | |
| 6,578,034 B1 | 6/2003 | Rafanello | |
| 6,615,365 B1 | 9/2003 | Jenevein et al. | |
| 6,675,176 B1 | 1/2004 | Shinkai et al. | |
| 6,675,242 B2 | 1/2004 | Benson et al. | |
| 6,963,951 B2 | 11/2005 | Ng et al. | |
| 6,976,060 B2 * | 12/2005 | Manczak et al. | 709/219 |
| 7,155,466 B2 * | 12/2006 | Rodriguez et al. | 707/205 |
| 7,299,314 B2 | 11/2007 | Lin et al. | |
| 2002/0059539 A1 | 5/2002 | Anderson | |
| 2002/0124108 A1 * | 9/2002 | Terrell et al. | 709/245 |
| 2003/0018657 A1 * | 1/2003 | Monday | 707/204 |
| 2003/0023811 A1 | 1/2003 | Kim et al. | |
| 2004/0255048 A1 * | 12/2004 | Lev Ran et al. | 709/249 |
| 2005/0081004 A1 | 4/2005 | Zhang | |
| 2005/0193021 A1 * | 9/2005 | Peleg | 707/200 |
| 2006/0031524 A1 * | 2/2006 | Freimuth et al. | 709/227 |

* cited by examiner

*Primary Examiner* — Jasmine Song
(74) *Attorney, Agent, or Firm* — McAndrews, Held & Malloy, Ltd.

(57) ABSTRACT

Herein described is a method and system for providing shared access to data residing within non-data pool related file systems. Aspects of the invention incorporate the use of one or more share access mechanisms by which access to the data occurs. The one or more share access mechanisms may be enabled or disabled by way of one or more selections that are made using a user interface. In a representative embodiment, the user interface may comprise a web browser. The method may involve assigning one or more values to one or more variables such that one or more name-value pairs are generated. The one or more name-value pairs are stored in a non-volatile memory. Execution of a software program may enable the one or more share access mechanisms when one or more assigned values are equal to one or more enabling values.

29 Claims, 3 Drawing Sheets

|  | NFS | CIFS | FTP | HTTP |
|---|---|---|---|---|
| Share #1 | X | ☐ | ☐ | X |
| Share #2 | ☐ | ☐ | ☐ | ☐ |
| Share #3 | ☐ | X | ☐ | ☐ |
| Share #4 | ☐ | ☐ | X | ☐ |

[ APPLY ]   [ CANCEL ]

Figure 3

METHOD AND SYSTEM FOR FLEXIBLY PROVIDING SHARED ACCESS TO NON-DATA POOL FILE SYSTEMS

RELATED APPLICATIONS/INCORPORATION BY REFERENCE

This application makes reference to and claims priority from U.S. Provisional Patent Application Ser. No. 60/648,583, entitled "METHOD AND SYSTEM FOR FLEXIBLY PROVIDING SHARED ACCESS TO NON-DATA POOL FILE SYSTEMS" filed on Jan. 31, 2005, the complete subject matter of which is incorporated herein by reference in its entirety.

This application makes reference to:
U.S. application Ser. No. 11/087,136, entitled "METHOD AND SYSTEM OF DATA STORAGE CAPACITY ALLOCATION AND MANAGEMENT USING ONE OR MORE DATA STORAGE DRIVES", filed Mar. 22, 2005;
U.S. application Ser. No. 11/338,917, entitled "METHOD AND SYSTEM FOR FLEXIBLY PROVIDING SHARED ACCESS TO DATA POOLS", filed Jan. 25, 2006.

The above stated applications are hereby incorporated herein by reference in their entireties.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

One or more users may wish to access data that was stored using one or more legacy file systems. The data may reside in one or more partitions of a data storage device. The data storage device may comprise one or more data storage drives, such as hard disk drives. The stored data may be accessed and shared by the one or more users. An administrator of the data storage device may wish to suspend or resume access to the shared data for one or more reasons. The administrator may wish to easily and efficiently suspend or resume access to the shared data. Unfortunately, administering or configuring such user access to one or more shares may be an arduous process for the administrator.

The limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Various aspects of the invention provide a system and method of providing shared access to data stored in non-data pool file systems, substantially as shown in and/or described in connection with at least one of the following figures, as set forth more completely in the claims.

These and other advantages, aspects, and novel features of the present invention, as well as details of illustrated embodiments, thereof, will be more fully understood from the following description and drawings.

DESCRIPTION OF THE DRAWINGS

FIG. 3 is a display of an administrative interface by which a user may configure one or more mechanisms that may be used to access one or more non-data pool shares, in accordance with an embodiment of the invention.

DETAILED DESCRIPTION OF THE INVENTION

Various aspects of the invention provide a system and method of providing shared access to non-data pool file systems. In a representative embodiment, access to the non-data pool file systems may be made by way of using a data pool file system. The data pool file system may employ an exemplary Reiser file system, for example. These non-data pool file systems may be referred to as legacy file systems. A data storage device that generates a data pool file system may be referred to as a network attached storage device (NAS). The non-data pool file systems may originate from standard DOS style partition tables. A file system that utilizes DOS style partition tables is representative of a non-data pool file system. The DOS style partition tables may employ the use of FAT (file allocation table), NTFS, or other like file system formats. The DOS style partition tables may employ file systems that are created using one or more partitions of a data storage drive or hard disk drive.

A data storage device that is networked with one or more data computing devices may be referred to as a network attached storage device (NAS). The data storage device may comprise one or more data storage drives, such as hard disk drives, or any other type of drive. The data storage device may comprise a combination of different types of data storage drives. A data storage drive may comprise any type of media capable of storing data. Hereinafter, the term "hard disk drive" alternatively may refer to a data storage drive or any drive or component comprising a media used to store data. In a representative embodiment, one or more data storage drives or hard disk drives may be incorporated into a data storage device. In a representative embodiment, the data storage device facilitates the incorporation of the one or more additional data storage drives or hard disk drives.

One or more data pools may be created using a data storage device. Each of the data pools may be considered a logical drive. Any unallocated space that resides over the one or more hard drives may be re-partitioned and then subsequently concatenated in order to generate a data pool. Portions of multiple hard disk drives may be used to create the data pool. For example, a portion of a first hard disk drive and a portion of a second hard disk drive may be used to form a data pool. In a representative embodiment, one or more hard disk drives are combined to provide increased data storage capacity and/or to provide data mirroring/data striping. In a representative embodiment, the hard disk drives are physically contained within a single data storage device. The data storage device may be networked using a local area network, for example, to provide a storage facility for any number of communicatively coupled data processing or computing devices. The data processing or computing devices may comprise one or more personal computers, for example.

Figure 1:
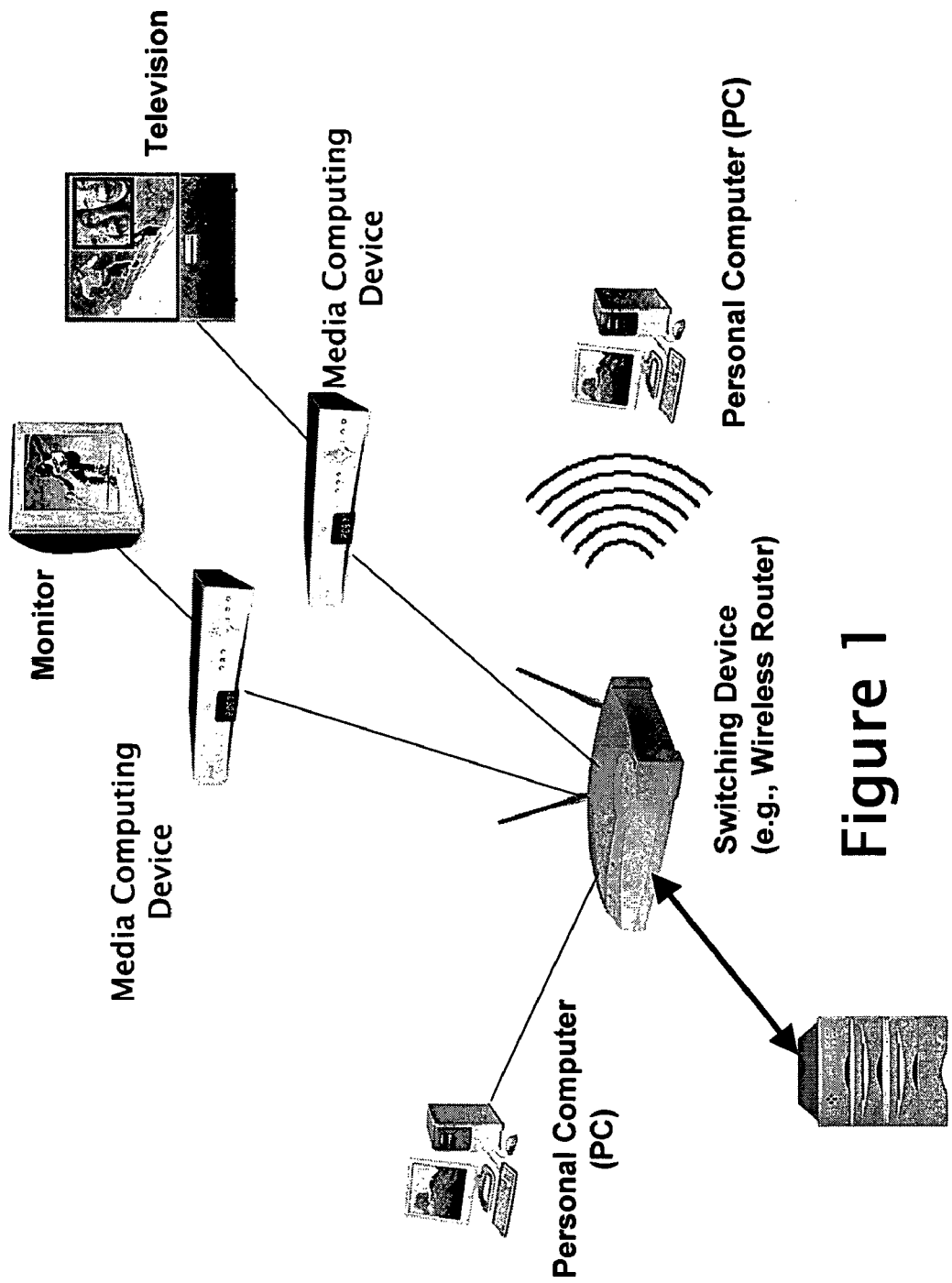
FIG. 1 illustrates a block diagram of a typical system incorporating the use of a data storage device, for providing shared access to data stored in the data storage device, using one or more mechanisms, in accordance with an embodiment of the invention.

FIG. 1 illustrates a block diagram of a typical system incorporating the use of a data storage device 100, for providing shared access to data stored in the data storage device 100, using one or more mechanisms, in accordance with an embodiment of the invention. The data storage device 100 may provide data storage for one or more data computing (or data processing) devices. As illustrated, an exemplary switching device provides connectivity of the data storage device 100 to the one or more data computing devices. The switching device, such as a wireless router, may be capable of providing connectivity by way of using wireless or wireline communications. For example, the switching device may utilize any one of the following wireless or wireline data communications protocols: 10/100 Ethernet, gigabit Ethernet, 802.11x, Bluetooth, and the like. As illustrated, the one or more data computing devices may comprise one or more personal computers (PCs), media computing devices, or any other like device, for example. The media computing devices, as illustrated, are connected to a television or a monitor capable of playing multimedia content. Use of the data storage device 100 may provide a centralized storage device for storing and retrieving data used by the one or more data computing devices. The data may be resident in one or more shares of one or more data pools. The one or more mechanisms that provide secure access to the data may comprise running or executing a software that flexibly allows a user, such as an administrator, to easily suspend or resume access to a share or shared directory. The software may be hereinafter referred to as an access control software (ACS). The ACS may be stored in a memory of the data storage device. The ACS may be stored in one or more data storage drives of the data storage device. The memory may comprise a non-volatile memory, such as a flash memory, for example. The ACS may be loaded when the data storage device is booted up, for example. A processor resident within a data storage device may be used to execute one or more sets of instructions of the ACS when the data storage device is booted up, for example.

Figure 2:
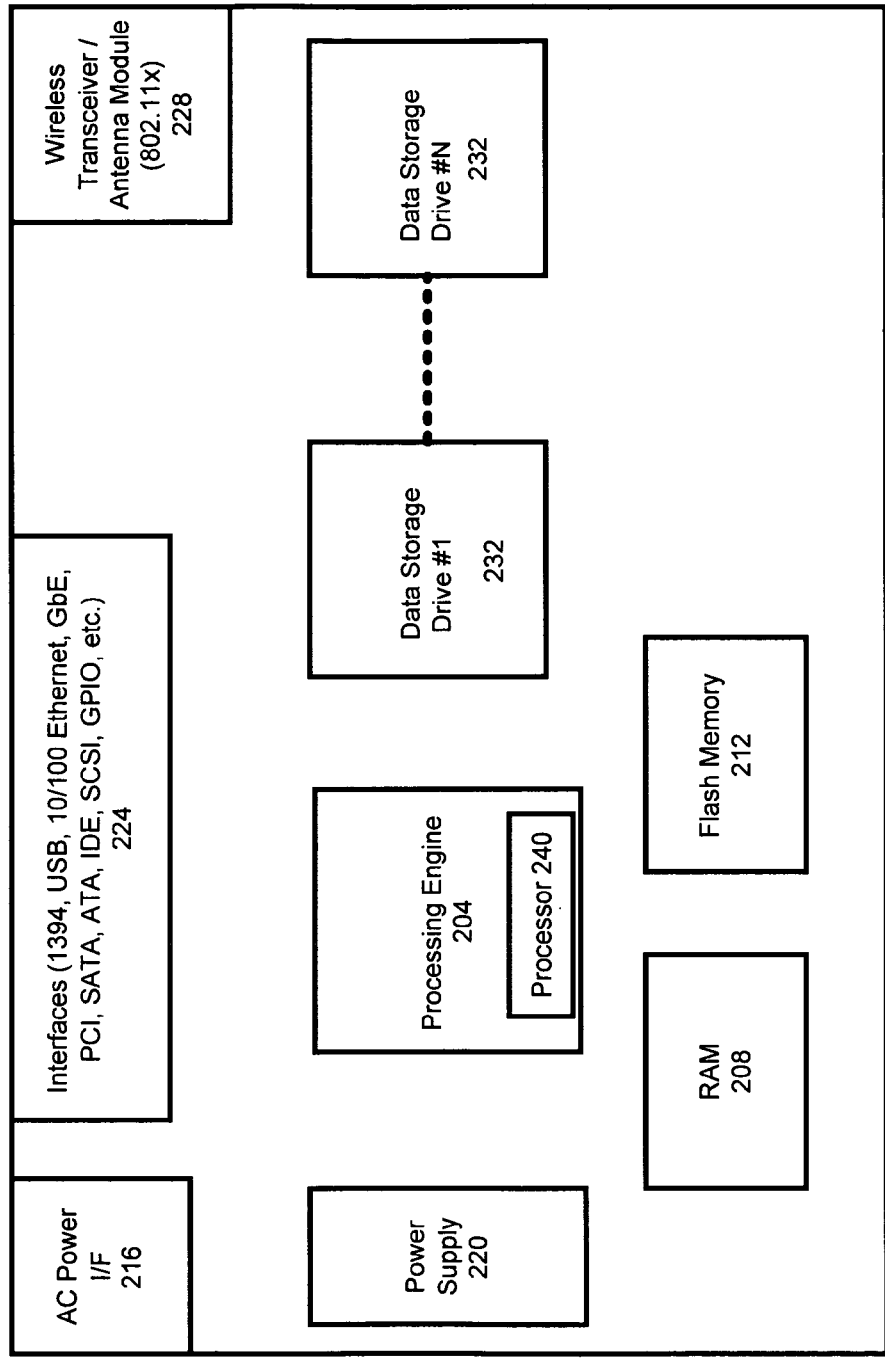
FIG. 2 is a block diagram of a data storage device that employs one or more mechanisms to control access to data stored in the data storage device, in accordance with an embodiment of the invention.

FIG. 2 is a block diagram of a data storage device 200 that employs one or more mechanisms to control access to data stored in the data storage device 200, in accordance with an embodiment of the invention. One or more mechanisms may comprise one or more data communications protocols. As illustrated the data storage device may comprise a processing engine 204 that utilizes a processor 240, a random access memory 208, a flash memory 212, an AC power interface 216, a power supply 220, one or more interfaces 224, a wireless transceiver/antenna module 228, and one or more data storage drives (such as one or more hard disk drives) 232. The one or more interfaces 224 may comprise the following interfaces, for example: IEEE 1394, USB, 10/100 Ethernet, gigabit Ethernet, PCI, SATA, ATA, IDE, SCSI, GPIO, etc. The wireless transceiver/antenna module 228 may comprise an attachable module or mini-PCI card that may be optionally connected or attached to the data storage device 200. The AC power interface 216 and power supply 220 may be used for providing power to the data storage device 200. The one or more data storage drives 232 may comprise any number of hard drives depending on the data storage requirements of the one or more data computing devices in the network. The random access memory 208 and flash memory 212 may be used for storing the ACS. The processor 240 may be used for executing the ACS that is resident in the flash memory 212, for example. The execution may be controlled and monitored by way of a data computing device, such as a personal computer (PC) that is communicatively coupled to the data storage device 200. The ACS may be downloaded into the flash memory 212 by way of control provided by, for example, the PC or another data computing device. In a representative embodiment, the processor 240 is implemented within the processing engine 204. The processing engine 204 may perform one or more other digital signal processing functions. When the software is executed, one or more of the following protocols may be utilized, for example: NFS (i.e., Network File System), CIFS (i.e., Common Internet File System), FTP (i.e., File Transfer Protocol), and HTTP (i.e., Hypertext Transfer Protocol). Each of the one or more protocols provides a mechanism by which a share may be accessed. Various aspects of the invention allow suspending and resuming access to a non-data pool share. Each of the one or more mechanisms used may operate independently of each other.

Various aspects of the invention provide one or more mechanisms by which the network attached storage device (NAS) flexibly provides shared access to data stored in one or more non-data pool file systems. The non-data pool file systems may originate from standard disk operating system (DOS or MS-DOS) style partition tables. The DOS style partition tables may employ the use of FAT (file allocation table), FAT32, NTFS, or other like file system formats. The DOS style partition tables may employ file systems that are created using one or more partitions of a data storage drive or hard disk drive.

As compared with non-data pool data, data pool data is generated from a NAS, as may be referenced in U.S. application Ser. No. 11/087,136 filed Mar. 22, 2005. Data pools may comprise one or more shares or shared directories. One or more authorized personnel or users may access data within the one or more shares.

Various aspects of the invention provide one or more access control mechanisms that are implemented by way of executing or running the software that is resident within the NAS (i.e., the ACS). The ACS may reside in a memory, such as a non-volatile random access memory (NVRAM) or flash memory of the NAS, as was described in relation to FIG. 2. Executing the ACS sets up access control to one or more non-data pool shares used by one or more users. The one or more mechanisms used may comprise the following protocols: NFS, CIFS, FTP, and HTTP, for example. Each of the one or more mechanisms provides a method by which a foreign share may be accessed. Various aspects of the invention allow suspending and resuming access to such a share. Each of the one or more mechanisms used operate independently of the others. A share may be described as a "native" share if it was generated by a NAS using data pools. A share may be described as a non-data pool share or "foreign" share if it was generated by way of a legacy file system that utilizes DOS partition tables.

In a representative embodiment, share access is controlled or configured by way of an administrative interface. The administrative interface may be implemented on any graphical user interface (GUI). The administrative interface may employ the use of a browser such as Microsoft Windows Internet Explorer or Netscape, for example. Share access by way of using a particular protocol may be enabled or disabled using the administrative interface.

FIG. 3 is a display of an administrative interface by which a user may configure one or more mechanisms that may be used to access one or more non-data pool shares, in accordance with an embodiment of the invention. In a representative embodiment, the administrative interface may comprise a web page that allows the user to input selections associated with a desired access configuration. The graphical user interface may resemble a table containing a number of selectable checkboxes. The user, such as an administrator, may check off a checkbox to select a particular share access mechanism. The table may comprise a number of rows and columns. Each row may represent a share (or share name or identifier) while each column may represent an access mechanism or method.

The share may correspond to a foreign or native share. When, for example, NFS, CIFS, FTP, and HTTP are used as the access mechanisms, the table may have four columns that are labeled NFS, CIFS, FTP, and HTTP. The checkboxes may be used by a user to indicate whether one or more members of a share are allowed access using a particular mechanism (i.e., NFS, CIFS, FTP, and HTTP). The user or administrator, may check off one or more checkboxes, using a point and click device, such as a mouse, for example, in order to provide share access using the one or more mechanisms. After all selections are made, a user may click or press the "apply" button to enable the selections. Should a user make an error during the selection process, he may click or press the "cancel" button, to clear all his selections. As illustrated in FIG. 3, a user has selected four checkboxes such that access to Share #1 is performed using NFS and HTTP, while access to Share #3 is performed using CIFS, while access to Share #4 is performed using FTP, for example. In the representative embodiment of FIG. 3, none of the four mechanisms or protocols (NFS, CIFS, FTP, HTTP) is used to provide access to Share #2. However, NFS and HTTP are used as mechanisms to provide access to Share #1, CIFS is used as a mechanism to provide access to share #3, while FTP is used as a mechanism to provide access to Share #4. When a user makes one or more selections by using the administrative user interface, he may effectively suspend or resume user access to the one or more shares. Shares #1-4 may correspond to one or more non-data pool or foreign shares.

When the apply button (as shown in FIG. 3) is clicked, a Javascript application executed using the browser or web page may perform one or more HTTP "post" operations that transmits one or more values associated with the selections to the NAS. The NAS may function as a web server, for example, to serve the Javascript application to the user's data computing device. The values transmitted may be incorporated into a NAS database as one or more name-value pairs. In a representative embodiment, the NAS may verify a newly supplied name-value pair to an existing name-value pair. The newly supplied name-value pair may replace the existing name-value pair that is stored in the NAS database. The database may be stored in a non-volatile memory of the NAS, such as a flash memory of the NAS. The database may be referred to as a "share specific variable database". The method of storing name-value pairs into a non-volatile random access memory (NVRAM) or flash memory may be referred to as an NVRAM mechanism. The name may be incorporated or referenced using a variable name referred to as an NVRAM variable, for example. A value may be assigned to an NVRAM variable to form a name-value pair. In a representative embodiment, both the variable name and the value must be zero-terminated ASCII strings. Arbitrarily many name-value pairs may be associated with any given share.

Shares that are created using non-data pool related file systems are created directly from partitions of a data storage drive or hard disk drive. These non-data pool related file systems may utilize standard DOS style partition tables, compared to that of data pool related file systems, such as those utilized by a NAS. Non-data pool related file systems may comprise FAT32, NTFS, or other like file systems. These non-data pool file systems may be implemented using one or more computing devices. The one or more computing devices may comprise one or more personal computers (PCs). Aspects of the invention provide that any non-data pool related data files (i.e., data not residing within data pools) should be readily accessible and identifiable to the NAS. However, a native share, residing within its corresponding data pool, is unable to be created when using such non-data pool related data file systems. As a consequence, the share specific variable database for defining such "foreign shares" is stored in the flash memory. The share specific variable database may comprise one or more name-value pairs. The NVRAM mechanism may utilize a portion of the flash memory (212, FIG. 2) previously described in relation to FIG. 2, for example. The NVRAM may store one or more share specific variables (i.e., NVRAM variables) used for specifying and/or identifying a foreign share. The processor (240, FIG. 2) may execute one or more software and/or firmware (i.e., the ACS) stored in the flash memory, in order to provide use of the access control mechanism. One or more name-value pairs are used to implement a share specific variable database. Details concerning the use of the term "native shares", in comparison to the term "foreign shares" as discussed herein, may be found in U.S. application Ser. No. 11/338,917, filed Jan. 25, 2006.

An NVRAM variable may be labeled or specified by using a prefix. The prefix may comprise the label, "partition_", for example. In a representative embodiment, the word "partition" is used because each foreign share maps to a particular partition on a particular data storage drive (or hard disk drive). One or more values may be used to differentiate the one or more foreign shares. A share specific variable may be set to a specific unique value, for example. For example, if there are three foreign shares, ShareA, ShareB, and ShareC, each having corresponding share specific variables (or NVRAM variables), then a potential mapping may be as follows: ShareA may be mapped to the value 0, ShareB may be mapped to the value 1, and ShareC may be mapped to the value 2. A unique prefix may be used for naming a variable associated with a foreign share. In a representative embodiment, a total of six NVRAM variables may be used to identify a foreign share and are named as follows:

partition_var_NNN_disk_interface
partition_var_NNN_disk_hardware_model_info
partition_var_NNN_disk_serial_number
partition_var_NNN_partition_number
partition_var_NNN_volume_key
partition_var_NNN_volume_label In a representative embodiment, the label "NNN" indicates the share number for a share. The six NVRAM variables are used to store or encode information related to a foreign share. The six NVRAM variables may uniquely identify a particular share by way of its share number. The first NVRAM variable, partition_var_NNN_disk_interface, may be set to "USB", "IDE", or "SATA" depending on the type interface used to access the data storage drive or hard disk drive containing the non-data pool data. The second NVRAM variable, partition_var_NNN_disk_hardware_model_info, may be set to a string, such as an alphanumeric string, that is used to specify the make and model of the data storage drive or hard disk drive containing the non-data pool data. This make and model information may be read through the IDE, SATA, or USB protocol as required and may be independent of any information written on the data storage drive or hard disk drive itself. The third NVRAM variable, partition_var_NNN_disk_serial_number, may be set to the serial number of the data storage drive or hard disk drive containing the non-data pool data. Each of the IDE, SATA, and USB protocols may provide a mechanism by which to read a data storage drive's serial number. It is contemplated that the serial number, as well as the make and model of the data storage drive, may be determined at the factory and normally may not be changed afterwards. The fourth NVRAM variable, partition_var_NNN_partition_number, may be set to a decimal ASCII string representing the number of the partition in the data storage drive in which the foreign share resides. For example, if the foreign share resides in partition number 3, the value for this variable will equal the value "3". The fifth NVRAM variable, partition_var_NNN_volume_key, may be set to eight ASCII hex digits that are used to represent a 32-bit value of the "volume key" field of a FAT file system, if the foreign share comprises a FAT file system. Typically, a software that creates FAT file systems inserts a timestamp or other unique identifier in this field such that two different FAT file systems are unlikely to have the same value for the volume key. Inserting this identifying information may insure that when a file system is reformatted on another data computing device (i.e., a personal computer), the one or more NVRAM variables associated with a particular foreign share will no longer be associated with the newly formatted file system when a data storage drive or hard disk drive is re-connected to its associated NAS. The sixth NVRAM variable, partition_var_NNN_volume_label, may be set to a user-visible volume label for the foreign share of a non-data pool data file system. For example, FAT file systems may support a volume label of up to 11 characters for identifying a file system to a user. A NAS may use the volume label as the basis for naming a foreign or native share.

In a representative embodiment, a match is said to occur with a corresponding set of share-specific variables only when the values provided by all NVRAM variables corresponds to that of a particular foreign share. In this representative embodiment, the set of share specific variables comprises six NVRAM variables, for example. In a representative embodiment, one or more variables named or labeled as partition_var_NNN_* are used to store share-specific variable information, where * is the name associated with the share-specific variable NNN. For example, if "partition_var_5_fred" were set to the value "Wilma", then the foreign share is associated with share-specific variable set number 5, and the variable with the name "fred" now has the value "Wilma". The share-specific variable set number refers to an index number or partition number corresponding to the share. Each of the share-specific variable set numbers indexes the one or more foreign shares. Hence, the total number of foreign share-specific variable set numbers used for indexing the one or more foreign shares determines the total number of non-data pool shares that are identifiable.

Aspects of the present invention utilize an update mechanism for easily listing all foreign share partition numbers that are currently assigned. The update mechanism allows provisioning of a new foreign share number such that a new partition number does not conflict when one or more share specific variables are created for a previously unassigned foreign share. The update mechanism prevents the NVRAM region of the flash memory from overloading with unused share data. The update mechanism is implemented using two linked lists associated with the NVRAM variables. The roots of the two linked lists correspond to the following NVRAM variables: partition_var_used_list and partition_var_free_list. Each of these two NVRAM variables contains ASCII decimal representation of integers. Each integer represents a foreign share variable set number. For each integer in the linked list, the next integer in the linked list is specified by an NVRAM variable named partition_var_NNN_next, where NNN is a number. If the NVRAM variable partition_var_NNN_next is not set to another value (i.e., NNN), this would indicate that the linked list ends at that point.

In a representative embodiment, the software used by a NAS may be designed such that there is a specific number of different foreign share-specific variable sets (i.e., maximum number of foreign or non-data pools shares) that the NAS will support. The number of different share-specific variable sets used for identifying non-data pool shares may be chosen to minimize the performance and/or memory requirements of the NAS. In a representative embodiment, the number of foreign share-specific variable sets may be set to 50. Initially the numbers 0 through 49 may be provided from a "free list" (a list of "free" or available foreign share-specific variable set numbers). When the numbers 0 through 49 are available, a "used list" (a list of used foreign share-specific variable set numbers) is empty. As new foreign shares are implemented, numbers are allocated for them from the free list and those corresponding numbers are placed on the used list. Also, when one or more foreign shares are recognized by the NAS, the NAS keeps track of the list of foreign share-specific variable set numbers previously used and those that are newly recognized. The NAS orders the list of specific variable set numbers such that any numbers associated with foreign shares that are currently connected are in the list before those that are associated with newly recognized foreign shares. Consequently, the used list is kept in an order that corresponds to the foreign share-specific variable set numbers seen most recently, with the least recently seen foreign share-specific variable number placed at the end of the used list. If the free list is empty and a new foreign share needs to be assigned, the last share-specific variable set number from the used list will be re-assigned to a new foreign share, and all old NVRAM variables for that number will be deleted from flash memory. Of course, in other embodiments, the number of share-specific variable set numbers that are used may be more or less than 50.

An NVRAM variable may be used to specify whether a particular share access control service is enabled or disabled. For example, when CIFS is used as a protocol, a variable termed cifs_enable (i.e., partition_var_NNN_cifs_enable) may be used as an NVRAM variable for determining if CIFS will provide access to a particular foreign share. Likewise, nfs_enable (i.e., partition_var_NNN_nfs_enable) may be used to define an NVRAM variable for determining whether NFS is used to provide access to a particular foreign share. Each of these exemplary NVRAM variables may be set to a value that enables its share access control service; correspondingly each service (i.e., CIFS, NFS, or the like) may provide access to its corresponding share. On the other hand, if either of these NVRAM variables are set to value that disables its share access for the associated service, the corresponding service is disabled. In addition to the one or more NVRAM variables that may be used to enable a particular share access control service, execution of the NAS software may employ the use of one or more default NVRAM variables. If, for example, cifs_enable is not set for a particular share, then its corresponding default control NVRAM variable, cifs_enable_default (i.e., partition_var_NNN_cifs_enable_default), may be used to determine whether or not the share is accessible using the CIFS service.

In the event that the NAS receives a new value for an NVRAM variable, the NAS may set the NVRAM variable to the new value. It may perform this by way of an HTTP "post" operation using a web server or web browser, for example. If necessary, the NAS executes software or code associated with a particular share access control service to either enable or disable access to its associated share. It is contemplated that this is performed differently based on the type of protocol or service used to implement the share control access service. When accessing a share using HTTP, notification may not be performed because each time a data is requested, an HTTP server verifies the values stored in one or more NVRAM variables before authorizing an access request. For NFS, a utility referred to as "exportfs" may be used to update one or more tables in a running kernel. The tables in the running kernel are verified when a request is received using NFS. For CFS, a Samba configuration file may be rebuilt and Samba may be sent a SIGHUP Linux signal. The SIGHUP Linux signal prompts Samba to reread its configuration file. Thereafter, an smbcontrol program, in Samba, may be used with a "close-share" program to send a message to one or more running Samba processes. This facilitates closing any currently open accesses to a share when the share is being suspended.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

What is claimed is:

1. A method comprising:
   generating one or more name-value pairs; and
   storing said one or more name-value pairs into a memory, said one or more name-value pairs used to uniquely identify one or more shared directories in a file system that uses DOS partition tables.

2. The method of claim 1 wherein said one or more name-value pairs is used to identify a type of disk interface associated with said one or more shared directories.

3. The method of claim 1 wherein said one or more name-value pairs is used to identify a make or model of a data storage drive associated with said one or more shared directories.

4. The method of claim 1 wherein said one or more name-value pairs is used to identify a serial number of a data storage drive associated with said one or more shared directories.

5. The method of claim 1 wherein said one or more name-value pairs is used to identify a partition number associated with said one or more shared directories.

6. The method of claim 1 wherein said one or more name-value pairs is used to identify a volume key field associated with said one or more shared directories.

7. The method of claim 1 wherein said one or more name-value pairs is used to identify a volume label associated with said one or more shared directories.

8. The method of claim 7 wherein said volume label is used for creating a share name.

9. The method of claim 1 wherein said file system comprises a FAT file system.

10. The method of claim 1 wherein said file system comprises a NTFS file system.

11. A method comprising:
    generating one or more name-value pairs corresponding to one or more selections input into a user interface;
    storing said one or more name-value pairs into a memory; and
    executing a software using said one or more name-value pairs to selectively enable one or more share access mechanisms based on said one or more name-value pairs, wherein each of said one or more share access mechanisms provides shared access to data stored in a directory of a DOS file system.

12. The method of claim 11 wherein said one or more share access mechanisms comprises NFS.

13. The method of claim 11 wherein said one or more share access mechanisms comprises CIFS.

14. The method of claim 11 wherein said one or more share access mechanisms comprises FTP.

15. The method of claim 11 wherein said one or more share access mechanisms comprises HTTP.

16. The method of claim 11 wherein said user interface comprises a web browser.

17. The method of claim 16 wherein said web browser comprises Microsoft Windows Internet Explorer.

18. The method of claim 11 wherein said memory comprises an NVRAM.

19. A data storage device for providing shared access to data stored in a non-data pool related file system comprising:
    a memory;
    a software resident in said memory; and
    a processor used for executing said software, said executing providing one or more mechanisms by which one or more shares on said non-data pool related file system may be accessed, said one or more mechanisms using a plurality of variables for uniquely identifying a share in said non-data pool related file system, wherein a variable of said plurality of variables is set to a value that enables share access of said share, and wherein a type of share access service associated with said share access is defined by said variable.

20. The system of claim 19 wherein said memory comprises a flash memory.

21. The system of claim 19 wherein said type of share access service comprises NFS.

22. The system of claim 19 wherein said type of share access service comprises CIFS.

23. The system of claim 19 wherein said type of share access service comprises FTP.

24. The system of claim 19 wherein said type of share access service comprises HTTP.

25. A data storage device comprising:
    a memory for storing one or more files and a software, said one or more files used for specifying whether one or more share access protocols are used for accessing one or more directories in a DOS file system, said one or more files configured based on share access protocol selections received using a graphical user interface generated from a device that is communicatively coupled to said data storage device; and
    a processor for executing said software and said one or more files to selectively provide share access to said one or more directories.

26. The data storage device of claim 25 further comprising:
    a plurality of data storage drives for storing data associated with said shared directories.

27. The data storage device of claim 26 wherein said data storage drives comprises hard disk drives.

28. A data storage device comprising:
    a memory for storing one or more files, said one or more files used for specifying whether one or more share access protocols are used for accessing one or more directories in a DOS file system, said one or more files configured based on one or more selections received using a graphical user interface;

a plurality of data storage drives for storing a software and for storing data associated with said one or more directories; and a processor for executing said software using said one or more files to selectively provide shared access to said one or more directories.

29. A method comprising:

receiving one or more selections that specify whether one or more share access protocols are used for accessing one or more shared directories in a DOS file system and in a Reiser file system;

generating data files corresponding to said one or more selections; and executing software using said data files to selectively enable said one or more share access protocols.

* * * * *